(12) United States Patent
Tanaka

(10) Patent No.: US 11,240,399 B2
(45) Date of Patent: Feb. 1, 2022

(54) IMAGE PROCESSING APPARATUS

(71) Applicants:KABUSHIKI KAISHA TOSHIBA, Tokyo (JP); TOSHIBA TEC KABUSHIKI KAISHA, Tokyo (JP)

(72) Inventor: Hiromasa Tanaka, Sunto Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/011,803

(22) Filed: Sep. 3, 2020

(65) Prior Publication Data

US 2020/0404120 A1 Dec. 24, 2020

Related U.S. Application Data

(63) Continuation of application No. 15/895,069, filed on Feb. 13, 2018, now Pat. No. 10,812,677.

(30) Foreign Application Priority Data

Aug. 1, 2017 (JP) .............................. JP2017-148905

(51) Int. Cl.
*H04N 1/387* (2006.01)
*G06T 3/40* (2006.01)
*G06T 7/12* (2017.01)

(52) U.S. Cl.
CPC ............. *H04N 1/3872* (2013.01); *G06T 3/40* (2013.01); *G06T 7/12* (2017.01);
(Continued)

(58) Field of Classification Search
None
See application file for complete search history.

(56) References Cited

U.S. PATENT DOCUMENTS

| 4,933,984 | A | 6/1990 | Nakano et al. |
| 6,853,749 | B2 | 2/2005 | Watanabe et al. |

(Continued)

FOREIGN PATENT DOCUMENTS

| JP | 2002010059 A | 1/2002 |
| JP | 2002185768 A | 6/2002 |

(Continued)

OTHER PUBLICATIONS

Chyi-Yeu Lin et al., Interactive Image Tools for Autonomous Spelling Robot, Journal of the Chinese Institute of Engineers, Jun. 1, 2012, pp. 473-492, vol. 35, No. 4.

(Continued)

*Primary Examiner* — Frantz Bataille
(74) *Attorney, Agent, or Firm* — Kim & Stewart LLP

(57) ABSTRACT

An image processing apparatus includes an interface through which scanned image data obtained by scanning a designated region, is acquired, and a processor. The processor extracts a contour line representing a document area from the scanned image data, extracts vertices of the contour line, determines whether a plurality of original documents is present in the document area based on the vertices, extracts document image data of each original document from the scanned image data, and generates one file including the extracted document image data for each original document.

17 Claims, 13 Drawing Sheets

(52) U.S. Cl.
CPC ........... *G06T 2207/10008* (2013.01); *G06T 2207/20021* (2013.01); *G06T 2207/20132* (2013.01); *G06T 2207/30176* (2013.01)

(56) References Cited

U.S. PATENT DOCUMENTS

| | | | |
|---|---|---|---|
| 8,849,042 B2 | 9/2014 | Kawatani et al. | |
| 2004/0213445 A1* | 10/2004 | Lee | G01S 7/52068 |
| | | | 382/128 |
| 2008/0018951 A1 | 1/2008 | Bannai | |
| 2008/0170784 A1* | 7/2008 | Guerzhoy | G06T 7/143 |
| | | | 382/173 |
| 2016/0132744 A1* | 5/2016 | Choi | G06K 9/32 |
| | | | 382/173 |
| 2016/0147386 A1* | 5/2016 | Han | G06F 40/279 |
| | | | 715/838 |
| 2019/0045079 A1 | 2/2019 | Tanaka | |
| 2020/0021711 A1 | 1/2020 | Tanaka | |

FOREIGN PATENT DOCUMENTS

| | | |
|---|---|---|
| JP | 2007081458 A | 3/2007 |
| JP | 2013092100 A | 5/2013 |
| JP | 2013106160 A | 5/2013 |
| JP | 2016186773 A | 10/2016 |
| JP | 2017130811 A | 7/2017 |

OTHER PUBLICATIONS

Extended European Search Report dated Sep. 12, 2018, mailed in counterpart European Application No. 18182194.3, 7 pages.
Japanese Office Action dated Feb. 9, 2021, mailed in counterpart Japanese Application No. 2017-148905, 6 pages (with translation).
European Office Action dated Feb. 1, 2021, mailed in counterpart European Application No. 18182194.3, 6 pages.
Neeta Nain et al., Corner Detection on Curves, GRAPP 2008—International Conference on Computer Graphics Theory and Applications, pp. 127-133.

* cited by examiner

IMAGE PROCESSING APPARATUS

CROSS-REFERENCE TO RELATED APPLICATIONS

This application is a continuation of U.S. patent application Ser. No. 15/895,069, filed on Feb. 13, 2018, which is based upon and claims the benefit of priority from Japanese Patent Application No. 2017-148905, filed Aug. 1, 2017, the entire contents of each of which are incorporated herein by reference.

FILED

Embodiments described herein relate generally to an image processing apparatus.

BACKGROUND

There is an image processing apparatus which scans a plurality of original documents at once and cuts out an image of each original document from the scanned image. The technology is known as multi-cropping processing. If the original documents overlap, the image processing apparatus cannot separate the overlapping original documents in some cases.

For this reason, conventionally, there is a problem in that the image processing apparatus cuts out plural overlapping original documents as one original document.

DETAILED DESCRIPTION

In accordance with an embodiment, an image processing apparatus comprises an interface through which scanned image data obtained by scanning a designated region, is acquired, and a processor. The processor extracts a contour line representing a document area from the scanned image data, extracts vertices of the contour line, determines whether a plurality of original documents is present in the document area based on the vertices, extracts document image data of each original document from the scanned image data, and generates one file including the extracted document image data for each original document.

Hereinafter, embodiments are described with reference to the accompanying drawings.

First Embodiment

First, the first embodiment is described.

An image processing apparatus according to the embodiment scans a plurality of original documents at once. The image processing apparatus executes a multi-cropping process for cutting out an image of each original document from the scanned images. The image processing apparatus generates one file from the images of a plurality of the original documents arranged in an overlapped manner after the multi-cropping processing is executed. The image processing apparatus may store the file in a medium. The image processing apparatus may send the file to an external device.

Figure 1:
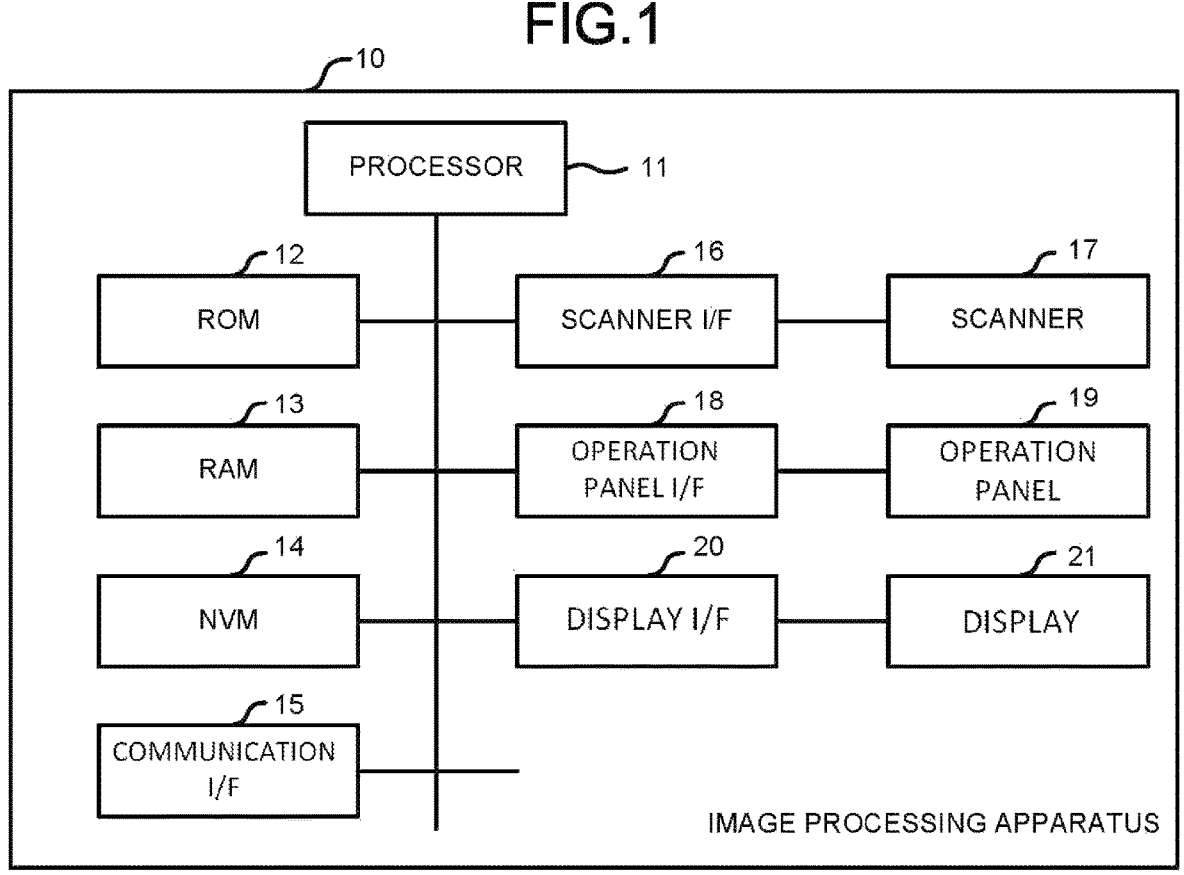
FIG. 1 is a block diagram of an image processing apparatus according to a first embodiment.

FIG. 1 is a block diagram of an image processing apparatus 10 according to the embodiment.

As shown in FIG. 1, the image processing apparatus 10 includes a processor 11, a ROM (read-only memory) 12, a RAM (random access memory) 13, a NVM (non-volatile memory) 14, a communication interface 15, a scanner interface 16, a scanner 17, an operation panel interface 18, an operation panel 19, a display interface 20 and a display 21 as basic hardware components.

The processor 11, the ROM 12, the RAM 13, the NVM 14, the communication interface 15, the scanner interface 16, the scanner 17, the operation panel interface 18 and the display interface 20 are connected to one another via a data bus or the like.

The scanner interface 16 and the scanner 17 are connected to each other via a data bus or the like. The operation panel interface 18 and the operation panel 19 are connected to each other via a data bus or the like. The display interface 20 and the display 21 are connected to each other via a data bus or the like.

The image processing apparatus 10 may have more or less hardware components than as shown in FIG. 1.

The processor 11 controls the operation of the image processing apparatus 10. The processor 11 may include an internal memory and various interfaces. The processor 11 executes various programs stored in the internal memory, the ROM 12 or the NVM 14.

Various functions realized by execution of the programs by the processor 11 may alternatively be implemented in a hardware circuit. In this case, the processor 11 controls the functions implemented in the hardware circuit.

The ROM 12 is a nonvolatile memory in which control programs, control data and the like are stored. The control program and the control data are stored in the ROM 12 in advance according to the specification of the image processing apparatus 10. The ROM 12 stores, for example, a program for controlling a circuit board of the image processing apparatus 10.

The RAM 13 is a volatile memory. The RAM 13 temporarily stores data being processed by the processor 11. The RAM 13 stores various application programs based on an instruction from the processor 11. The RAM 13 may store data necessary for executing the application program, an execution result of the application program, and the like.

The NVM 14 is a nonvolatile memory capable of writing and rewriting data. The NVM 14 may be a hard disk, a SSD, an EEPROM®, a flash memory, or the like. The NVM 14 stores the programs, the applications, and various data that are used in operating the image processing apparatus 10.

The communication interface 15 is used for transmitting and receiving data to and from an external device. For example, the communication interface 15 supports a LAN connection or a Bluetooth® Technology connection.

The scanner interface 16 is used by the processor 11 to communicate with the scanner 17. For example, the scanner interface 16 acquires the scanned image from the scanner 17. The scanner interface 16 transmits the acquired scanned image to the processor 11. The processor 11 transmits a signal for enabling the scanner 17 to perform scanning through the scanner interface 16.

The scanner 17 reads an image based on a signal from the processor 11 or the like. For example, the scanner 17 scans the original document set on a document table. In one embodiment, the scanner 17 moves a group of sensors arranged linearly to read the original document, and moves a carriage that supplies light, which is directed to the original document and reflected from the original document to the sensors. The scanner 17 is not limited to a specific type. Also, in this example, the original document is assumed to be rectangular.

The scanner 17 transmits scanned image data obtained by reading the image to the processor 11. The scanner 17 may store the scanned image data in the RAM 13 or other memory.

The operation panel interface 18 is used by the processor 11 to communicate with the operation panel 19. For example, the processor 11 receives a signal indicating an operation input to the operation panel 19 through the operation panel interface 18.

Various operations are input to the operation panel 19 by a user of the image processing apparatus 10. The operation panel 19 sends a signal indicating an operation input by the user to the processor 11. The operation panel 19 is, for example, a keyboard, a numeric keypad or a touch panel. The operation panel 19 may receive an input of a gesture from the user.

The display interface 20 is used by the processor 11 to communicate with the display 21. For example, the processor 11 sends a signal for enabling the display 21 to display a screen through the display interface 20.

The display 21 is used for displaying an image output by the processor 11. The display 21 is, for example, a liquid crystal monitor or the like.

If the operation panel 19 is a touch panel, the operation panel 19 and the display 21 may be integrated into a single unit, e.g., a control panel. Similarly, the operation panel interface 18 and the display interface 20 may also be integrated.

Next, the functions realized by the processor 11 are described. The following functions are realized by the execution of the programs stored in the NVM 14 by the processor 11.

First, the processor 11 has a function of acquiring the scanned image data obtained by scanning the original document.

For example, the processor 11 receives an operation to start scanning through the operation panel 19. Here, the user sets the original document such as a business card, a card or a document on the document table of the scanner 17. The user places the original documents which he/she wishes to put in one file in an overlapped manner and sets them on the document table. The user inputs an operation to start the scan to the operation panel 19.

If the input of the operation is received, the processor 11 transmits a signal for performing the scan to the scanner 17. The scanner 17 receives the signal and scans the original document. The scanner 17 transmits the scanned image data obtained by the scanner 17 to the processor 11, which may store the scanned image data in the RAM 13 or other memory.

Figure 2:
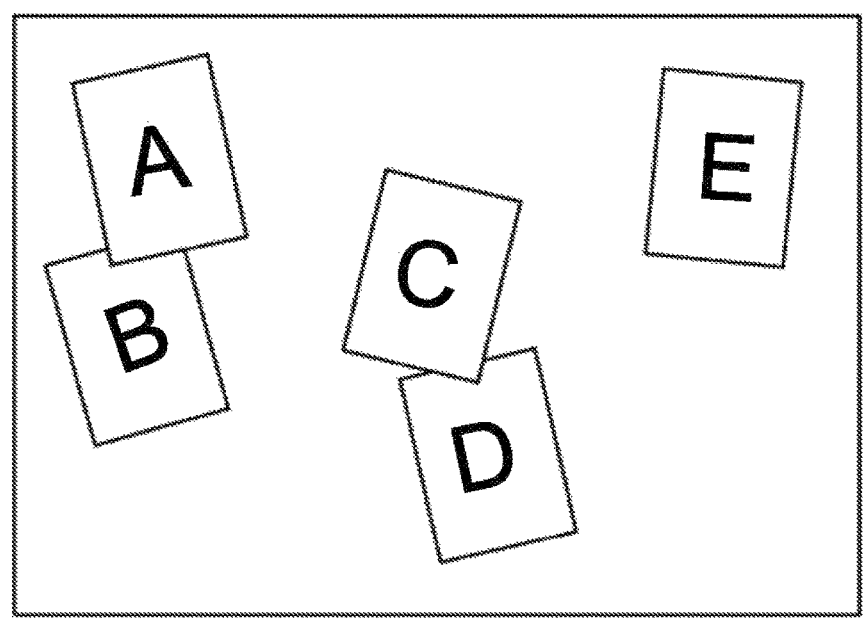
FIG. 2 is a diagram of a scanned image.

FIG. 2 shows an example of the scanned image. As shown in FIG. 2, the scanned image shows original documents A to E. Here, the original documents A and B overlap. The original documents C and D overlap. The original document E does not overlap with the other original documents.

The processor 11 may execute a high image quality processing such as a binarization processing on the scanned image.

The processor 11 also has a function of extracting from the scanned image the contour line of a document area in which the original document appears.

For example, the processor 11 extracts the contour line of the document area by executing an image processing such as edge detection. However, the method by which the processor 11 extracts the contour line is not limited to any specific method.

Figure 3:
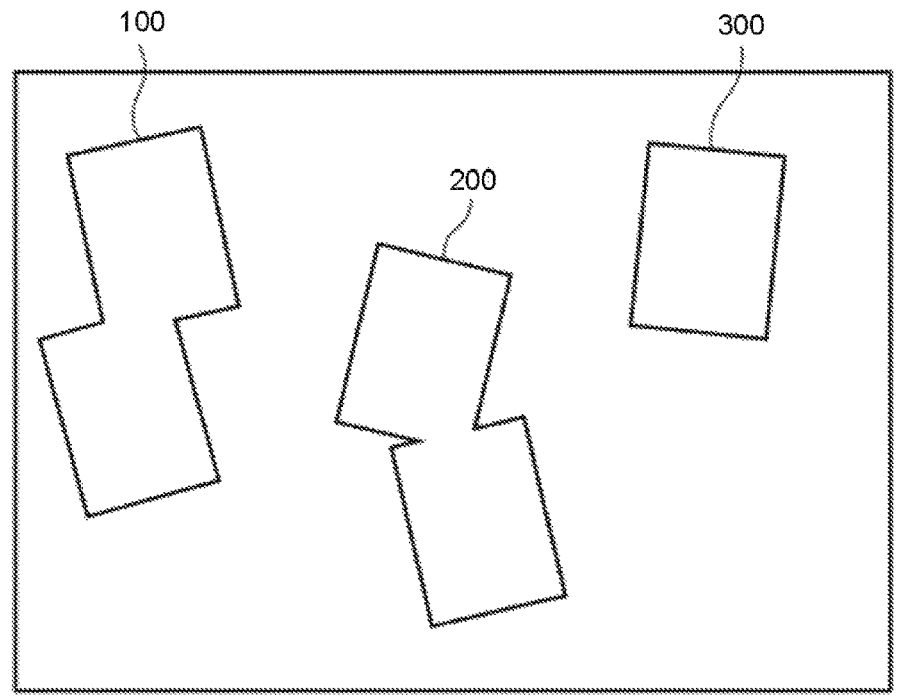
FIG. 3 is a diagram of a contour line.

FIG. 3 shows an example of the contour line extracted by the processor 11. As shown in FIG. 3, the processor 11 extracts contour line 100, contour line 200 and contour line 300. The contour line 100 includes the contour lines of the original documents A and B. The contour line 200 includes the contour lines of the original documents C and D. The contour line 300 includes the contour line of the original document E.

The processor 11 has a function of extracting vertices from the contour line.

For example, the processor 11 extracts the vertices from feature value of the image including the contour line. The processor 11 may calculate a curvature at each point of the contour line to extract the vertex. The method by which the processor 11 extracts the vertex is not limited to a specific method.

Figure 4:
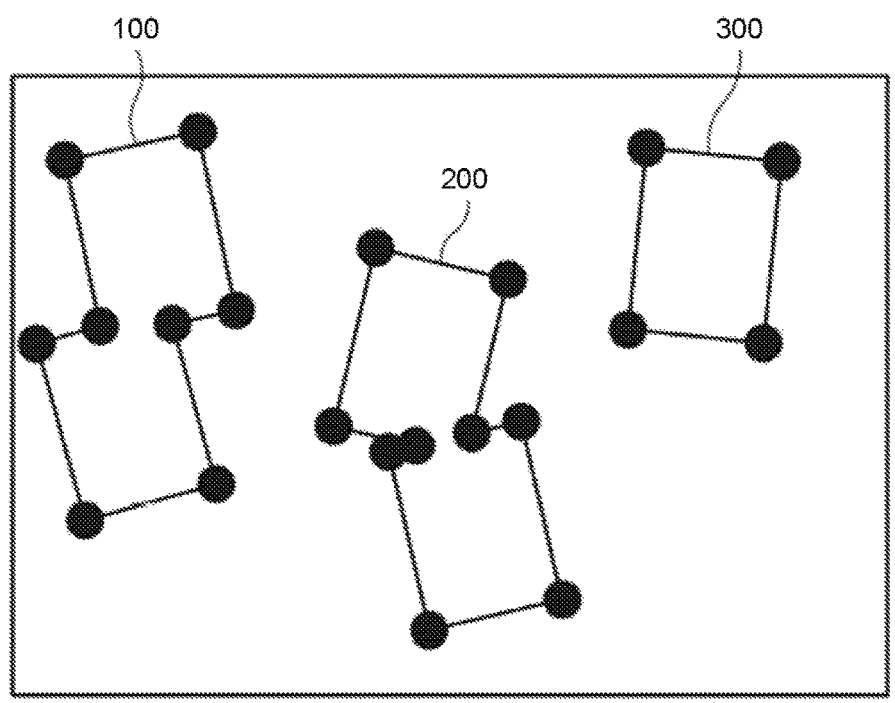
FIG. 4 is a diagram of vertices.

FIG. 4 shows an example of the vertex extracted by the processor 11. In FIG. 4, black dots indicate the vertices. As shown in FIG. 4, the processor 11 extracts the vertices at corners of the original document. The processor 11 extracts the vertex at a point where edges of each overlapping original document intersect.

The processor 11 has a function of determining whether a plurality of the original documents overlaps.

The processor 11 determines whether a plurality of the original documents overlaps in the contour lines. The processor 11 determines whether the original documents overlap based on the number of the vertices of the contour lines.

If the original documents do not overlap, the processor 11 extracts four vertices at the corners of the original document from the contour line of the original document. If a plurality of the original documents overlaps, the processor 11 extracts five or more vertices as the vertices at the points where the edges of the original documents intersect in addition to the corners of the original document are extracted.

Therefore, if the number of vertices from the contour line is five or more, the processor 11 determines that a plurality of the original documents overlaps in the contour line.

The method by which the processor 11 determines the overlap of the original documents is not limited to a specific method.

Further, the processor 11 has a function of extracting first to third vertices adjacent to each other and forming a right angle from the extracted vertices.

The processor 11 extracts three consecutively adjacent vertices (referred to herein as first to third vertices) from the extracted vertices. The first to the third vertices are consecutive along the contour line.

For example, the processor 11 calculates an angle between a straight line formed by the first vertex and the second vertex which are consecutive and a straight line formed by the second vertex and the third vertex which are consecutive. If the calculated angle is a right angle, the processor 11 extracts the first to the third vertices as the first to the third vertices adjacent to each other and forming the right angle. The processor 11 may extract the third vertex when the calculated angle is within a predetermined angle range, e.g., from 85 degrees to 95 degrees, in consideration of some margin of error.

Figure 5:
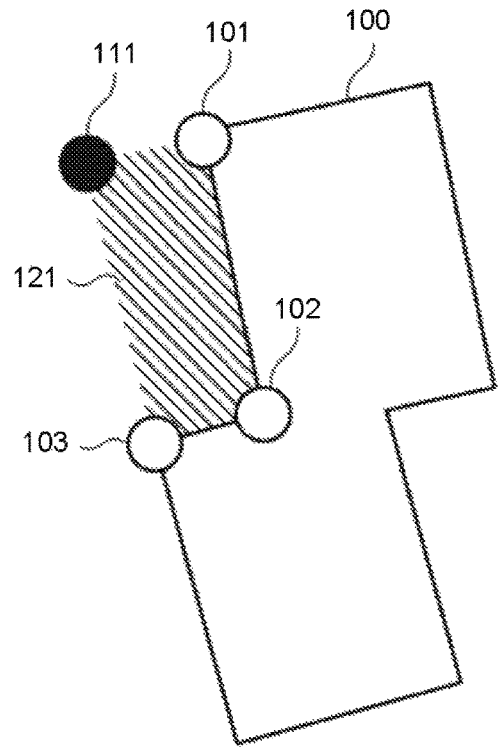
FIG. 5 is a diagram of a rectangle set by the image processing apparatus according to the first embodiment.
Figure 6:
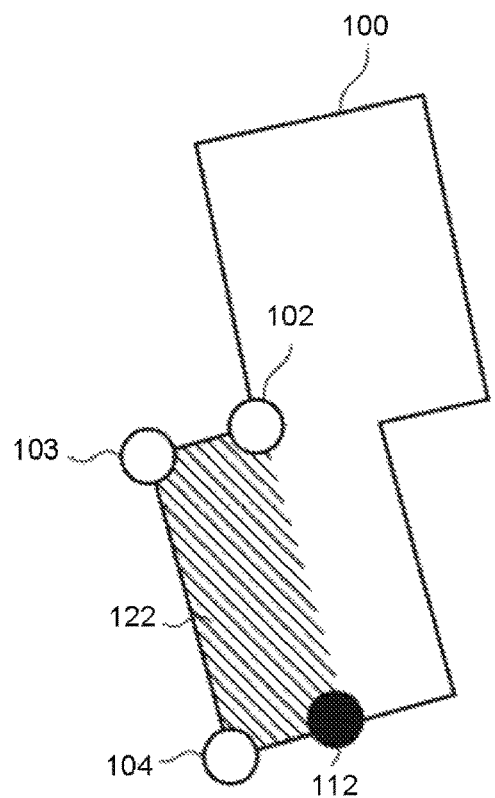
FIG. 6 is a diagram of the rectangle set by the image processing apparatus according to the first embodiment.

FIG. 5 and FIG. 6 show two examples of the first to the third vertices extracted by the processor 11 from the contour line 100.

In the example shown in FIG. 5, the processor 11 extracts the vertices 101 to 103. Here, an angle between a straight line formed by the vertex 101 and the vertex 102 and a straight line formed by the vertex 102 and the vertex 103 is approximately a right angle, i.e., within the predetermined angle range of a right angle.

In the example shown in FIG. 6, the processor 11 extracts the vertices 102 to 104. Here, an angle between the straight line formed by the vertex 102 and the vertex 103 and a straight line formed by the vertex 103 and the vertex 104 is a right angle.

The processor 11 has a function of estimating a fourth vertex which forms a rectangle with the extracted first to third vertices.

In other words, the processor 11 estimates the fourth vertex so that the first to the fourth vertices form a rectangle. For example, the processor 11 calculates a vector extending from the second vertex to the third vertex. The processor 11 estimates the fourth vertex by adding a vector to the first vertex.

The method by which the processor 11 estimates the fourth vertex is not limited to a specific method.

In the example shown in FIG. 5, the processor 11 estimates a vertex 111 as the fourth vertex. As shown in FIG. 5, the vertices 101 to 103 and 111 form an approximate rectangle.

In the example shown in FIG. 6, the processor 11 estimates a vertex 112 as the fourth vertex. As shown in FIG. 6, the vertices 102 to 104 and 112 form the rectangle.

The processor 11 also has the function of determining whether the rectangle formed by the first to the fourth vertices is within the document area defined by the contour line.

The processor 11 sets a rectangle from the first to the fourth vertices. The processor 11 then determines whether the set rectangle is contained in the contour line.

In the example shown in FIG. 5, the processor 11 sets a rectangle 121 from the vertices 101 to 103 and 111. As shown in FIG. 5, the processor 11 determines that the approximate rectangle 121 is not within the document area because it is formed outside the contour line.

In the example shown in FIG. 6, the processor 11 sets the rectangle 122 from the vertex 102 to 104 and 112. As shown in FIG. 6, the processor 11 determines that the rectangle 122 is within the document area.

The processor 11 stores the rectangle determined to be within the document area as a candidate rectangle in the RAM 13 or the NVM 14.

For example, the processor 11 stores the rectangle 122 as the candidate rectangle.

The processor 11 has a function of deleting the candidate rectangle contained in another candidate rectangle.

The processor 11 acquires the candidate rectangle from the RAM 13 or the NVM 14. The processor 11 determines whether the candidate rectangle is included in another candidate rectangle. If the processor 11 determines that the candidate rectangle is included in another candidate rectangle, the processor 11 deletes the candidate rectangle.

The processor 11 specifies the remaining candidate rectangle not included in another candidate rectangle as a single document area where one original document appears.

Figure 7:
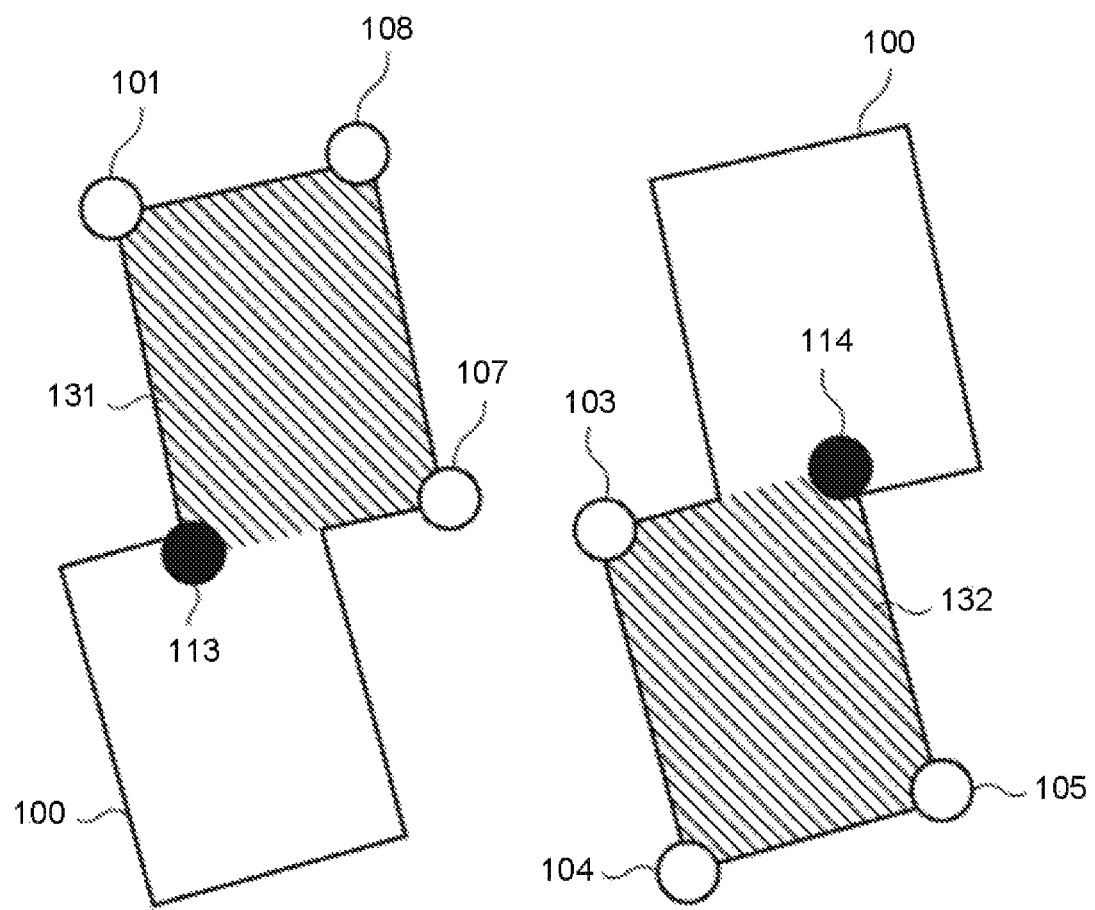
FIG. 7 is a diagram of an area of a document image.

FIG. 7 shows an example of the single document area specified by the processor 11. As shown in FIG. 7, the processor 11 specifies the rectangle formed by vertices 101, 107, 108 and 113 as a single document area 131. The processor 11 also specifies the rectangle formed by the vertices 103, 104, 105 and 114 as a single document area 132.

The processor 11 has a function of extracting the document image of each original document from the scanned image based on the single document area.

The processor 11 extracts the image in the single document area as the document image from the scanned image. In the example shown in FIG. 7, the processor 11 extracts the document image of the original document A from the single document area 131. The processor 11 extracts the document image of the original document B from the single document area 132.

The processor 11 may correct an inclination of the document image. The processor 11 may execute various high image quality processing on the document image.

The processor 11 also has a function of generating one file including the document image of each of the original documents arranged in the overlapped manner.

The processor 11 collectively stores the document images of the original documents arranged in the overlapped manner in one file.

For example, the processor 11 generates one multi-page file which stores one of the document images of the original documents arranged in the overlapped manner on a first page and another of the document images of the original documents arranged in the overlapped manner on a second page. For example, the processor 11 generates a PDF file from the document image.

The processor 11 generates the file from the document images of the original documents which are not overlapped.

For example, the processor 11 generates one single-page PDF file from one document image.

In the example shown in FIG. 2, the processor 11 generates one file from the document image of the original document A and the document image of the original document B. The processor 11 generates one file from the document image of the original document C and the document image of the original document D. The processor 11 generates one file from the document image of the original document E.

The processor 11 may store the generated file in the NVM 14. The processor 11 may store the file in a memory (such as a USB memory) inserted in the image processing apparatus 10. The processor 11 may transmit the file to the external device through the communication interface 15.

Figure 8:
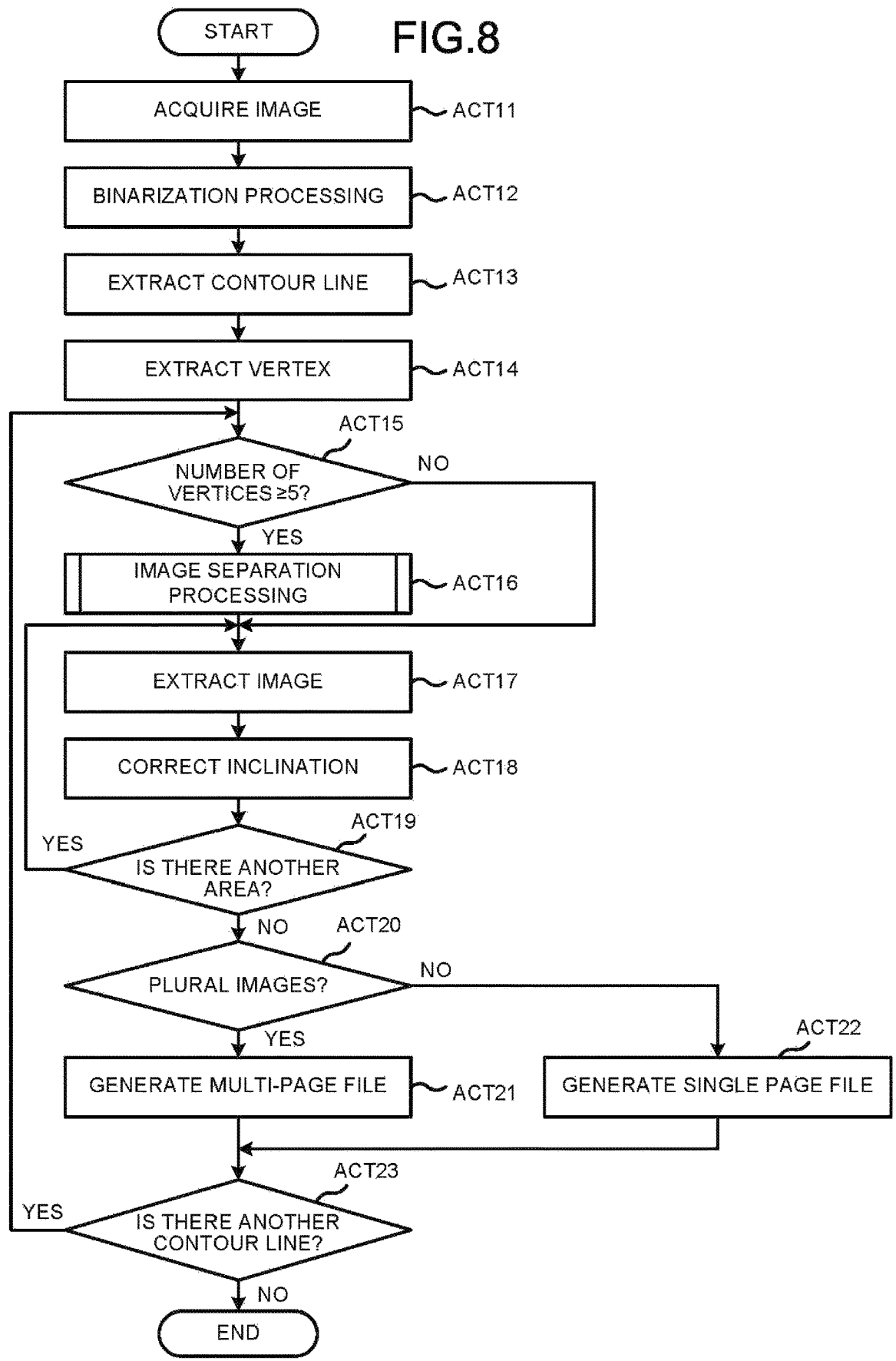
FIG. 8 is a flowchart of the operation of the image processing apparatus according to the first embodiment.

Next, an example of the operation of the image processing apparatus 10 is described. FIG. 8 is a flowchart of the operation of the image processing apparatus 10. Here, the user sets the original document on the scanner 17 and inputs an operation to start the scan to the operation panel 19.

First, the processor 11 of the image processing apparatus 10 acquires the scanned image obtained by scanning the original document from the scanner 17 through the scanner interface 16 (ACT 11). Once the scanned image has been acquired, the processor 11 executes the binarization processing on the scanned image (ACT 12).

Once the binarization process has been executed, the processor 11 extracts the contour line of the document area from the scanned image (ACT 13). Once the contour line has been extracted, the processor 11 extracts the vertices from the contour line (ACT 14).

Once the vertex has been extracted, the processor 11 determines whether the number of vertices in one contour line is five or more (ACT 15). If it is determined that the number of vertices in one contour line is five or more (Yes in ACT 15), the processor 11 executes an image separation processing (which is processing described above to generate the single document area) (ACT 16).

If it is determined that the number of vertices in one contour line is not five or more (No in ACT 15), or once the image separation processing has been executed (ACT 16), the processor 11 extracts one document image from the scanned image (ACT 17).

Once the document image has been extracted, the processor 11 corrects the inclination of the document image (ACT 18). Once the inclination of the document image has been corrected, the processor 11 determines whether there is another single document area (ACT 19).

If it is determined that there is another single document area (Yes in ACT 19), the processor 11 returns to the processing in ACT 17.

If it is determined that there is no other single document area (No in ACT 19), the processor 11 determines whether there is a plurality of the document images (ACT 20). If it is determined that there is a plurality of the document images (Yes in ACT 20), the processor 11 generates a multi-page file from the plurality of the document images (ACT 21). If it is determined that there is not a plurality of the document images (No in ACT 20), the processor 11 generates a single page file from the original document (ACT 22).

Once the multi-page file has been generated from the plurality of the document images (ACT 21) or the single page file has been generated from the original document (ACT 22), the processor 11 determines whether there is another contour line (ACT 23).

If it is determined that there is another contour line (Yes in ACT 23), the processor 11 returns to the processing in ACT 15. If it is determined that there is no other contour line (No in ACT 23), the processor 11 ends the operation.

Figure 9:
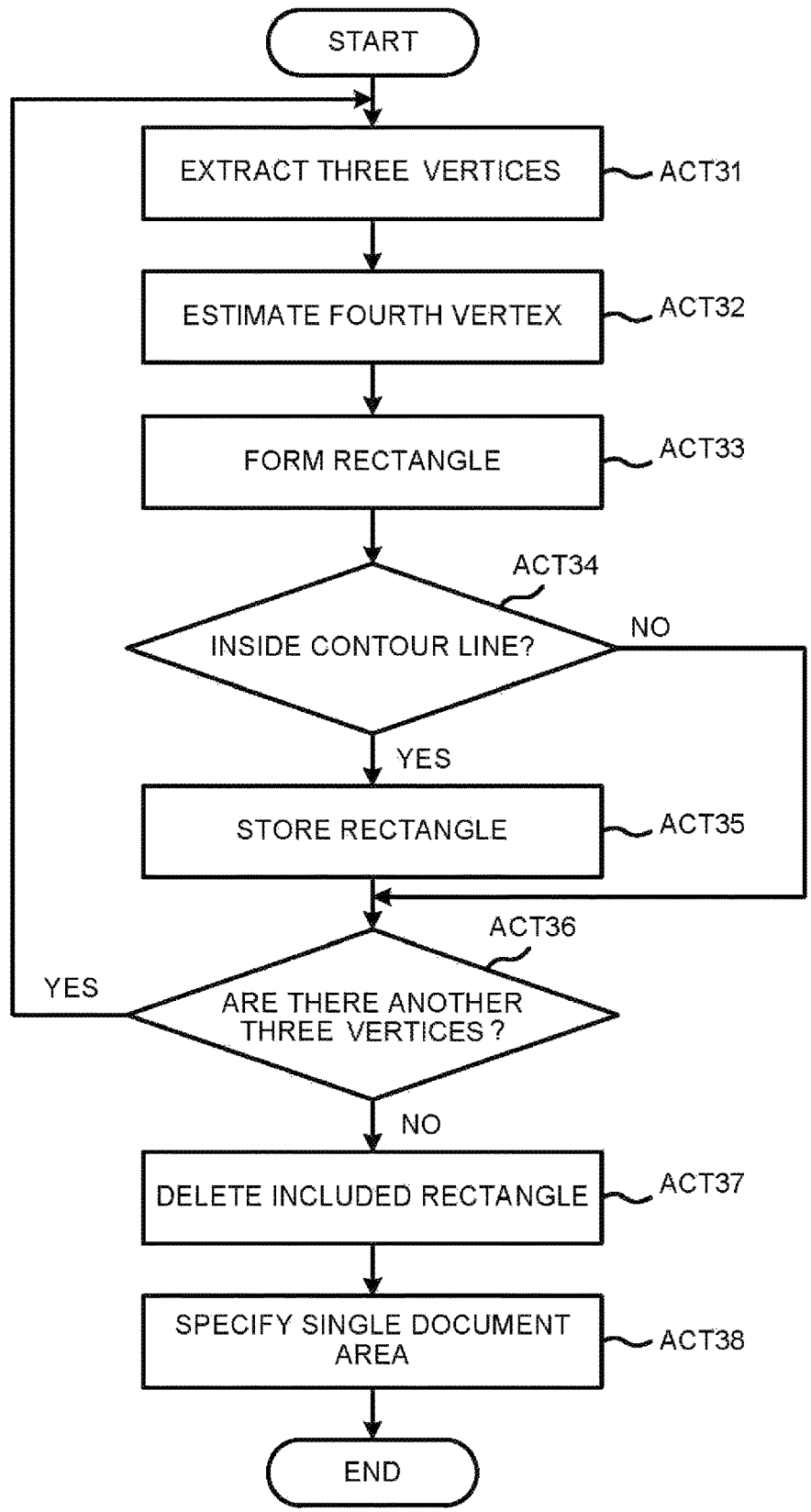
FIG. 9 is a flowchart of the operation of the image processing apparatus according to the first embodiment.

Next, an example of the operation in which the processor 11 executes the image separation processing (ACT 16) is described. FIG. 9 is a flowchart of the operation in which the processor 11 executes the image separation processing.

The processor 11 extracts the first to the third vertices that are adjacent to each other and form a right angle (ACT 31). Once the first to the third vertices have been extracted, the processor 11 estimates the fourth vertex forming a rectangle with the first to the third vertices (ACT 32).

Once the fourth vertex has been estimated, the processor 11 forms the rectangle from the first to the fourth vertices (ACT 33). Once the rectangle has been formed, the processor 11 determines whether the formed rectangle is inside the contour line (ACT 34).

If it is determined that the formed rectangle is inside the contour line (Yes in ACT 34), the processor 11 stores the rectangle as the candidate rectangle (ACT 35).

If it is determined that the formed rectangle is not inside the contour line (No in ACT 34), or once the rectangle has been stored as the candidate rectangle (ACT 35), the processor 11 determines whether there are another extracted three vertices (ACT 36).

If it is determined that there are another extracted three vertices (Yes in ACT 36), the processor 11 returns to the processing in ACT 31.

If it is determined that there is no other extracted three vertices (No in ACT 36), the processor 11 deletes the candidate rectangle contained in another candidate rectangle (ACT 37). Once the candidate rectangle contained in another candidate rectangle has been deleted, the processor 11 specifies the remaining candidate rectangle as the single document area (ACT 38).

If the remaining candidate rectangle is specified as the single document area, the processor 11 ends the operation.

The processor 11 may generate files, each of which includes a document image of one of the overlapping original documents.

The image processing apparatus may include a printer for printing images on a paper. The processor 11 may control the printer to print the document image. If the processor 11 generates one file from a plurality of the document images, the processor 11 may print the document images on both sides.

The image processing apparatus as described above extracts the contour lines of a plurality of the original documents arranged in the overlapped manner from the scanned image. The image processing apparatus specifies the document area in which one original document appears based on the vertexes of the contour line. Therefore, the image processing apparatus can extract the document image of each original document even if the original documents are arranged in the overlapped manner. As a result, the image processing apparatus can effectively execute the multi-cropping process.

The image processing apparatus generates one file from the original documents arranged in the overlapped manner. Therefore, the image processing apparatus can generate a multi-page file without receiving an operation of generating the multi-page file from the user through the operation panel.

Second Embodiment

Next, the second embodiment is described.

An image processing apparatus 1 according to the second embodiment differs from the image processing apparatus 1 according to the first embodiment in that it searches for the third vertex forming the right angle with the first and the second vertices. Therefore, for the other points, the same reference numbers are given and the detailed description thereof is omitted.

The image processing apparatus 1 according to the second embodiment is the same as that of the first embodiment. Therefore, the description of the image processing apparatus 1 according to the second embodiment is omitted.

Next, the functions carried out by the processor 11 are described. The following functions are carried out by execution of the program stored in the NVM 14 by the processor 11.

First, the processor 11 has a function of extracting adjacent first and second vertices from the extracted vertices.

The processor 11 extracts two vertices directly connected to each other by the contour line as the first and the second vertices from the extracted vertices.

Here, the processor 11 acquires the scanned image in which three original documents appear.

Figure 10:
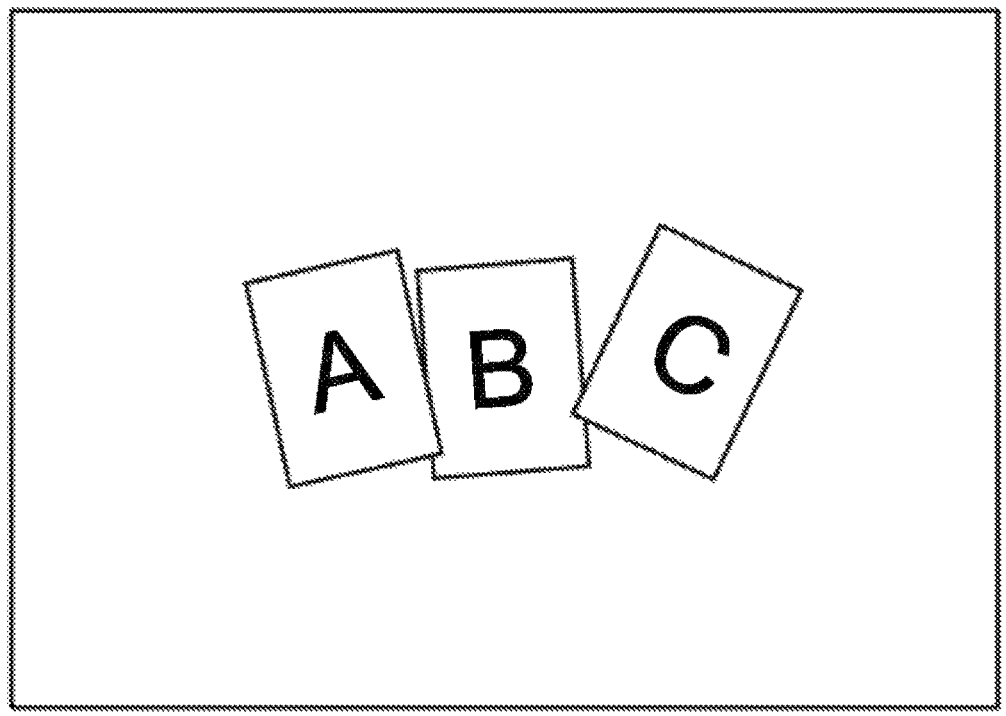
FIG. 10 is a diagram of a scanned image that is processed according to a second embodiment.

FIG. 10 shows an example of the scanned image. As shown in FIG. 10, the scanned image shows the original documents A to C. Here, the original documents A and B overlap. The original documents B and C overlap.

Figure 11:
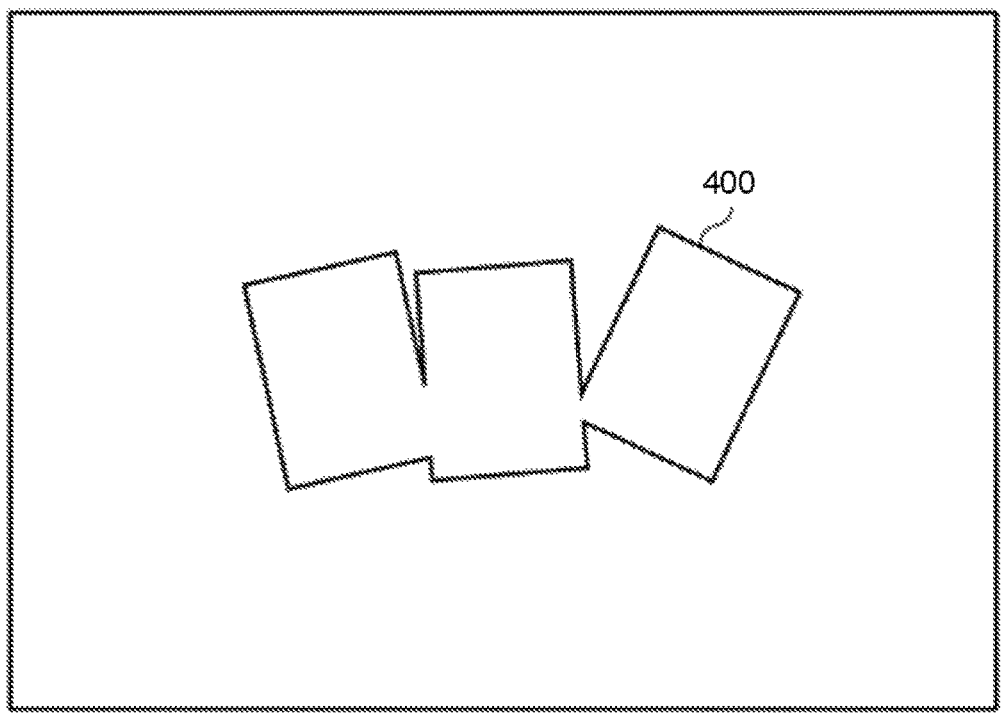
FIG. 11 is a diagram of a contour line that is determined according to the second embodiment.

FIG. 11 shows an example of the contour line extracted by the processor 11. As shown in FIG. 11, the processor 11 extracts a contour line 400. The contour line 400 is the contour lines of the original documents A, B and C.

Figure 12:
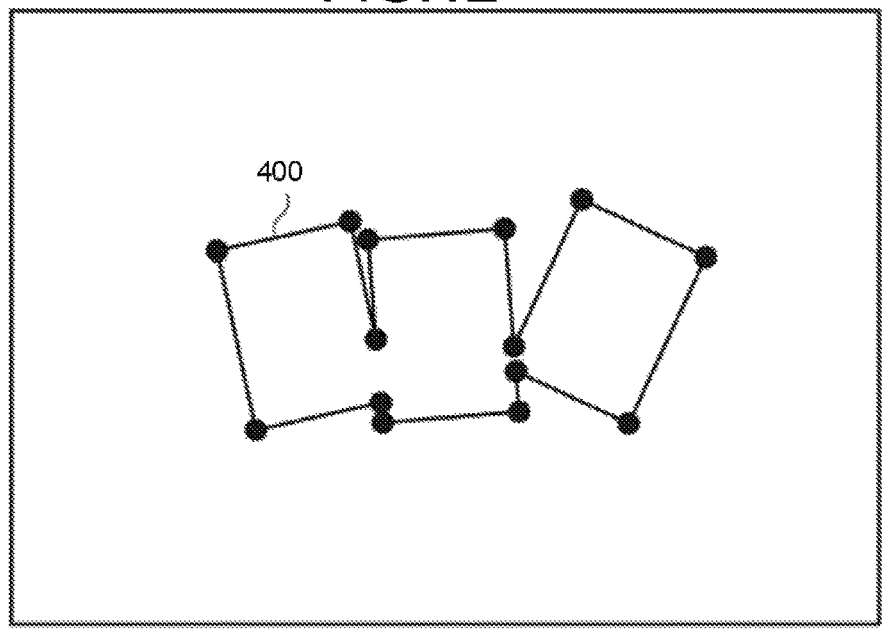
FIG. 12 is a diagram of vertices that are determined according to the second embodiment.

FIG. 12 shows an example of vertices extracted by the processor 11. In FIG. 12, black dots indicate vertices. As shown in FIG. 12, the processor 11 extracts the vertices at the corners of the original documents. The processor 11 extracts the vertex at a point where the edges of the overlapped original documents intersect.

Figure 13:
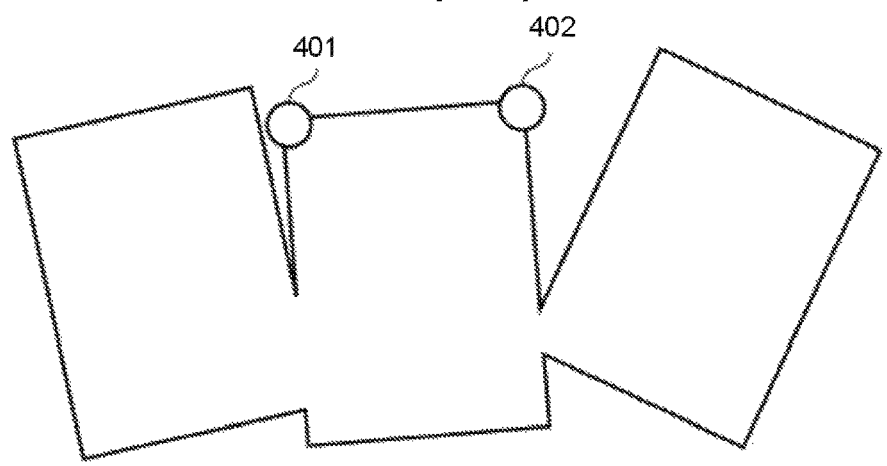
FIG. 13 is a diagram of first and second vertices extracted by an image processing apparatus according to the second embodiment.

FIG. 13 shows an example of the first and the second vertices extracted by the processor 11. In the example shown in FIG. 13, the processor 11 extracts vertices 401 and 402. The vertex 401 and the vertex 402 are directly connected along the contour line 400.

The processor 11 has a function of searching for the third vertex forming the right angle with the first and the second vertices from the extracted vertices.

The processor 11 determines a third vertex such that a straight line formed by the first vertex and the second vertex is orthogonal to a straight line formed by the second vertex and the third vertex. Alternatively, the processor 11 determines a third vertex such that the straight line formed by the first vertex and the second vertex is orthogonal to a straight line formed by the first vertex and the third vertex.

FIG. 14 to FIG. 17 show an example of the operation in which the processor 11 searches for the third vertex.

Figure 14:
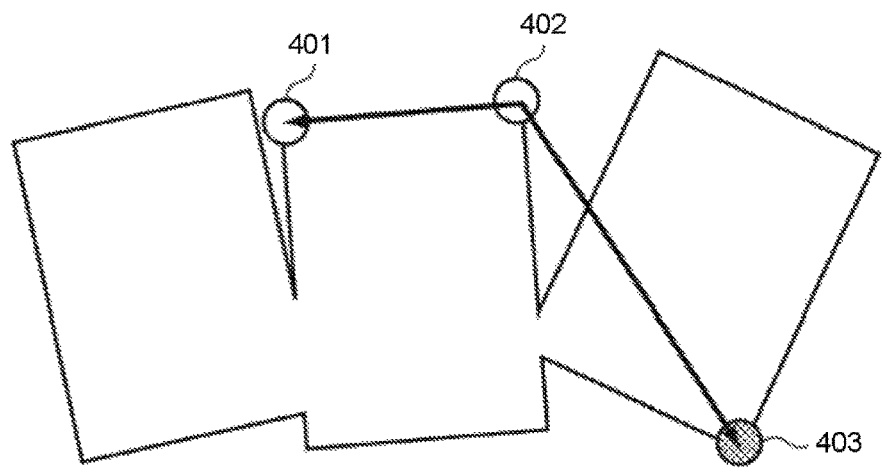
FIG. 14 is a diagram of a third vertex extracted by the image processing apparatus according to the second embodiment.

In the example shown in FIG. 14, the processor 11 determines whether a vertex 403 is the third vertex. As shown in FIG. 14, an angle formed by the straight line formed by the vertex 401 and the vertex 402 and the straight line formed by the vertex 402 and the vertex 403 is not a right angle. The angle formed by the straight line formed by the vertex 401 and the vertex 402 and the straight line formed by the vertex 401 and the vertex 403 is not a right angle. Therefore, the processor 11 determines that the vertex 403 is not the third vertex for the vertices 401 and 402.

Figure 15:
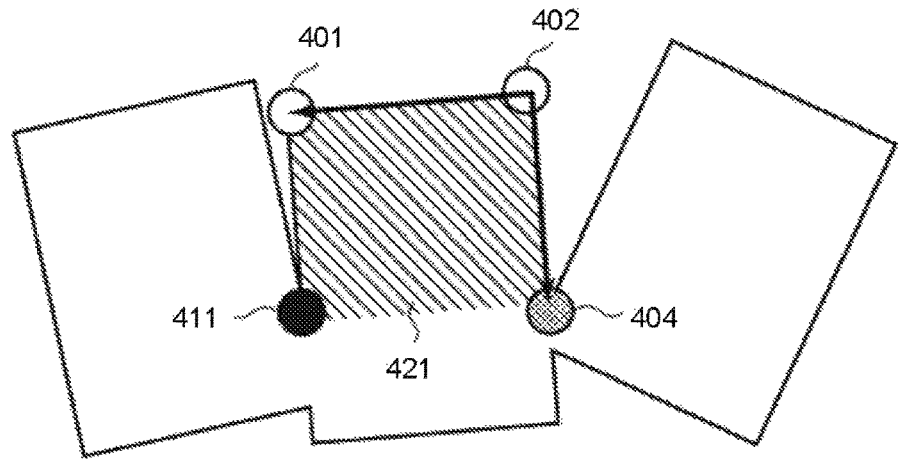
FIG. 15 is a diagram of a rectangle set by the image processing apparatus according to the second embodiment.

In the example shown in FIG. 15, the processor 11 determines whether a vertex 404 is the third vertex. As shown in FIG. 15, an angle formed by the straight line formed by the vertex 401 and the vertex 402 and a straight line formed by the vertex 402 and the vertex 404 is a right angle. Therefore, the processor 11 determines the vertex 404 as the third vertex for the vertices 401 and 402.

Figure 16:
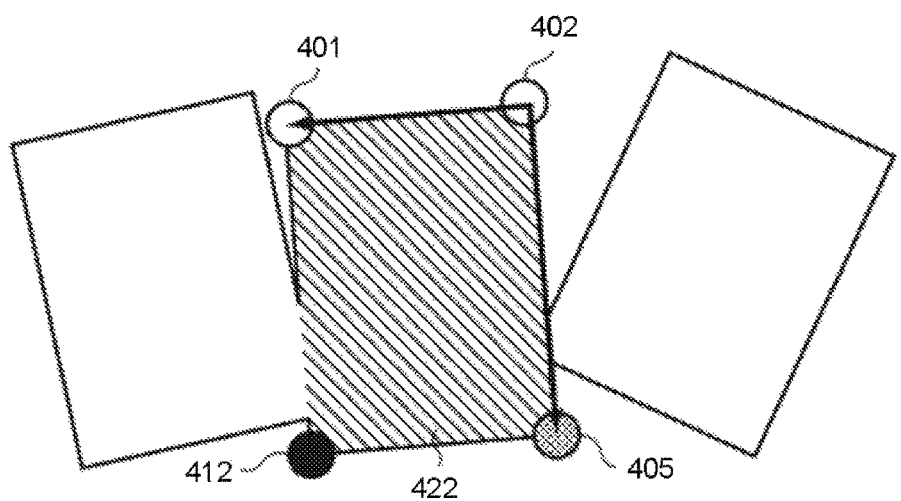
FIG. 16 is a diagram of a candidate rectangle set by the image processing apparatus according to the second embodiment.

In the example shown in FIG. 16, the processor 11 determines whether a vertex 405 is the third vertex. As shown in FIG. 16, an angle formed by the straight line formed by the vertex 401 and the vertex 402 and a straight line formed by the vertex 402 and the vertex 405 is a right angle. Therefore, the processor 11 determines that the vertex 405 is the third vertex for the vertices 401 and 402.

Figure 17:
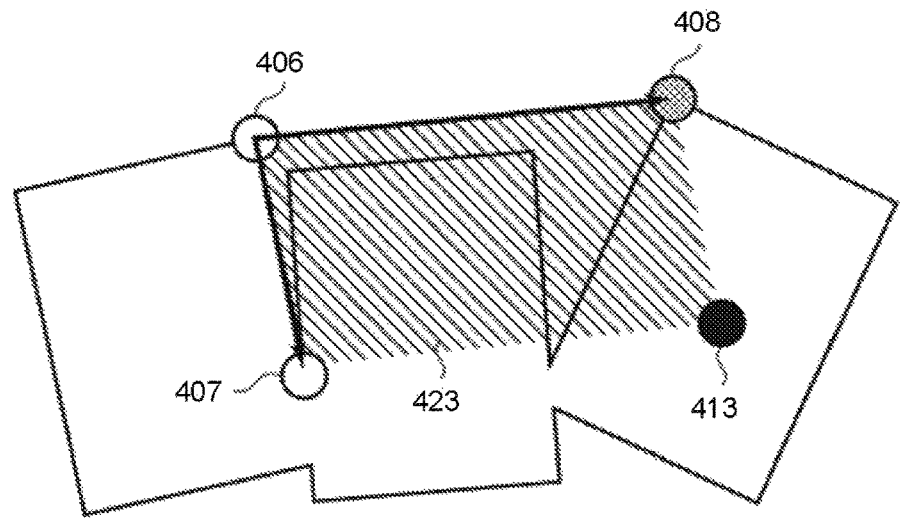
FIG. 17 is a diagram of the candidate rectangle set by the image processing apparatus according to the second embodiment.

In the example shown in FIG. 17, the processor 11 determines whether a vertex 408 is the third vertex. Here, the processor 11 extracts vertices 406 and 407 as the first and the second vertices.

As shown in FIG. 17, an angle formed by the straight line formed by the vertex 406 and the vertex 407 and the straight line formed by the vertex 406 and the vertex 408 is slightly less than a right angle. It is possible to extract the vertex 408 as the third vertex, as shown in FIG. 17, because the processor 11 is configured to extract the third vertex even if though the angle formed by the two lines is a little less or larger than 90 degrees, e.g., in the range of 85 degrees to 95 degrees.

The processor 11 also has the function of estimating the fourth vertex which forms a rectangle with the extracted first and second vertices and the searched third vertex.

In other words, the processor 11 estimates the fourth vertex such that the first to the fourth vertices form the rectangle. For example, the processor 11 calculates a vector extending from the second vertex to the third vertex. The processor 11 estimates the fourth vertex by adding a vector to the first vertex.

The method by which the processor 11 estimates the fourth vertex is not limited to a specific method.

In the example shown in FIG. 15, the processor 11 estimates a vertex 411 as the fourth vertex. As shown in FIG. 15, the vertices 401, 402, 404 and 411 form the rectangle. In the example shown in FIG. 16, the processor 11 estimates a vertex 412 as the fourth vertex. As shown in FIG. 16, the vertices 401, 402, 405 and 412 form the rectangle.

In the example shown in FIG. 17, the processor 11 estimates a vertex 413 as the fourth vertex. As shown in FIG. 17, the vertices 406 to 408 and 413 form an approximate rectangle.

The processor 11 has a function of determining whether the rectangle formed by the first to the fourth vertices is within the document area defined by the contour line.

The processor 11 sets a rectangle from the first to the fourth vertices. The processor 11 determines whether the set rectangle is inside the contour line.

In the example shown in FIG. 15, the processor 11 sets a rectangle 421 from the vertices 401, 402, 404 and 411. As shown in FIG. 15, the processor 11 determines that the rectangle 421 is within the document area. In the example shown in FIG. 16, the processor 11 sets the rectangle 422 from the vertices 401, 402, 405, and 412. As shown in FIG. 16, the processor 11 determines that the rectangle 422 is within the document area.

In the example shown in FIG. 17, the processor 11 sets a rectangle 423 from the vertices 406, 407, 408 and 413. As shown in FIG. 17, the processor 11 determines that the rectangle 423 is outside the document area because it extends beyond the contour line.

The processor 11 stores the rectangles determined to be within the document area as the candidate rectangles in the RAM 13 or the NVM 14.

The processor 11 has the function of deleting the candidate rectangle contained in another candidate rectangle.

The processor 11 acquires the candidate rectangle from the RAM 13 or the NVM 14. The processor 11 determines whether the candidate rectangle is included in another candidate rectangle. If the processor 11 determines that the candidate rectangle is included in another candidate rectangle, the processor 11 deletes the candidate rectangle.

For example, since the rectangle 421 is included in the rectangle 422, the processor 11 deletes the rectangle 421.

The processor 11 specifies the remaining candidate rectangle not included in another candidate rectangle as a single document area in which one original document appears.

Figure 18:
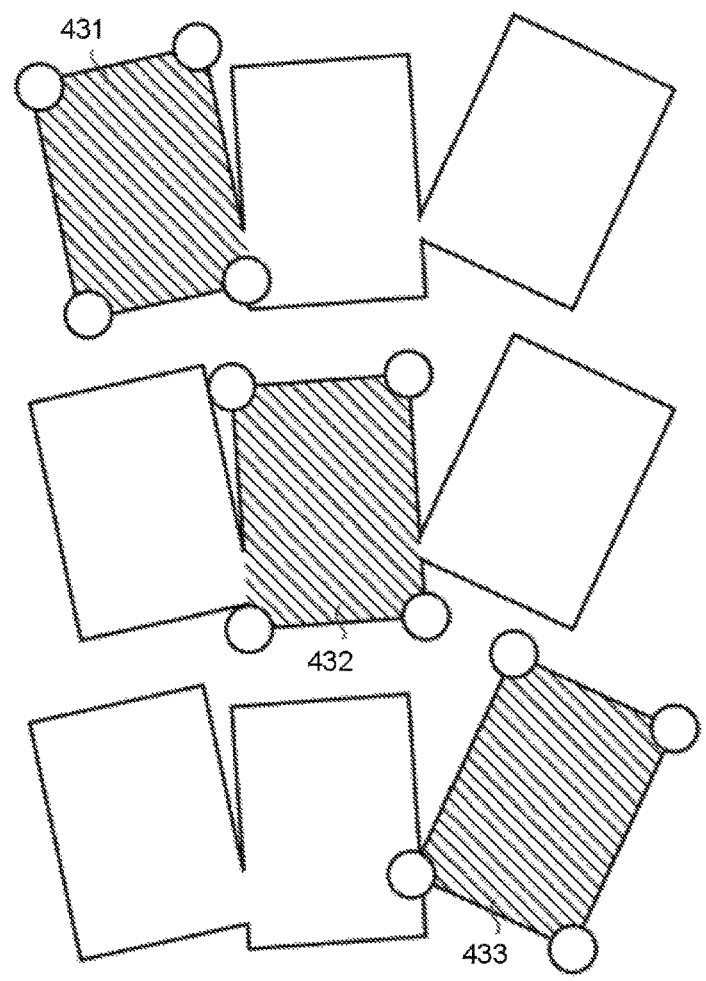
FIG. 18 is a diagram of an area of a document image.

FIG. 18 shows an example of the single document area specified by the processor 11. As shown in FIG. 18, the processor 11 specifies single document areas 431, 432 and 433.

The processor 11 has a function of calculating an overlap ratio of a range where the single document area overlaps with another single document area.

The processor 11 calculates the overlap ratio for each single document area. For example, the processor 11 determines an area of each single document area ("first area") and then an overlapping area of one single document area with respect to another single document area ("second area"). Each area of the three document areas 431,432,433 is determined based on image data obtained by scanning, in particular the number of pixels that are included in each respective document area. To determine the overlapping area, pixel data of one document area (e.g., document area 431) is compared with pixel data of another document area (e.g., document area 432) to determine the number of common pixels included in the two areas, and the size of the overlapping area is calculated based on the number of common pixels.

The processor 11 divides the second area by the first area to calculate the overlap ratio of the single document area.

In the example shown in FIG. 18, the processor 11 specifies an area of the single document area 431. The processor 11 calculates an overlapping area between the single document area 431 and the single document area 432. The processor 11 calculates an overlap ratio of the single document area 431 by dividing the overlapping area by the area of the single document area 431.

The processor 11 specifies the area of the single document area 432. The processor 11 calculates and sums the overlapping areas between the single document area 432 and the single document areas 431 and 433. The processor 11 calculates the overlap ratio of the single document area 432 by dividing the total overlapping area by the area of the single document area 432.

The processor 11 similarly calculates the overlap ratio for the single document area 433.

The processor 11 has a function of presenting a warning to the single document area of which the overlap ratio exceeds a predetermined threshold value.

For example, the processor 11 displays a warning for each single document area indicating that the overlap ratio exceeds the predetermined threshold value on the display 21. For example, the processor 11 displays the document image in the single document area with a warning.

Figure 19:
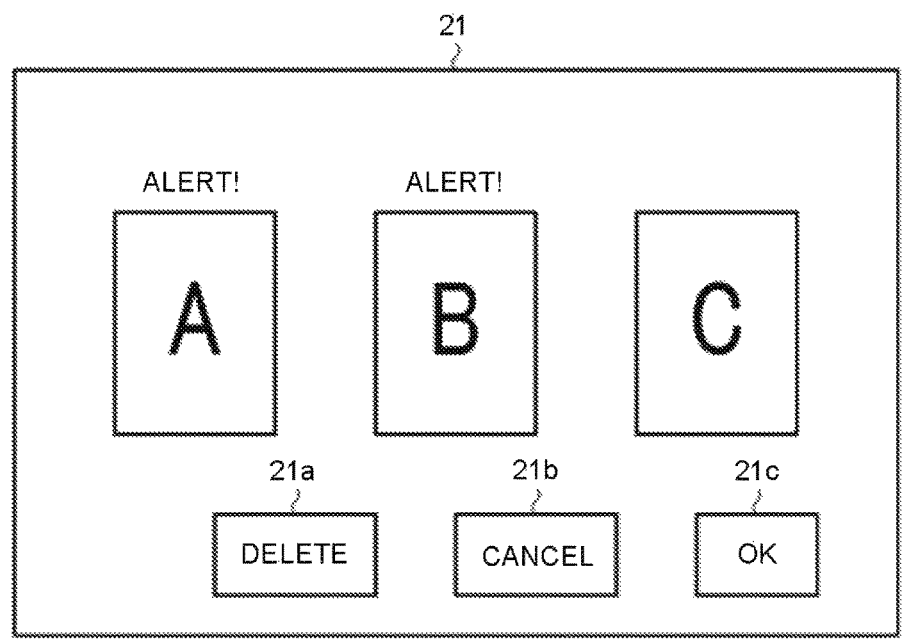
FIG. 19 is a diagram of the display of a display in the second embodiment.

FIG. 19 shows an example of the warning displayed on the display 21. As shown in FIG. 19, the processor 11 displays the document image of the original document A in the single document area 431, the document image of the original document B in the single document area 432, and the document image of the original document C in the single document area 433. The processor 11 controls to display thumbnails of the document images.

Here, the processor 11 determines that the overlap ratio of the single document area 431 and the single document area 432 exceeds a predetermined threshold value.

The processor 11 controls to display a warning in the vicinity of the document image of the original document A and the document image of the original document B. Here, the processor 11 controls to display "ALERT!" as the warning. The processor 11 may control to display other phrase as the warning. The processor 11 may change a color or a thickness of a frame of the document image.

As shown in FIG. 19, the processor 11 may control to display an icon 21a for deleting the document image (in particular, one of the document images A, B, and C selected by the user), an icon 21b for canceling the scanning operation, and an icon 21c for saving the document image.

The processor 11 has a function of generating the files individually including the respective document images.

If a tap on the icon 21c is received, the processor 11 generates the files including the respective document images individually.

For example, the processor 11 generates a file including the document image of the original document A, a file including the document image of the original document B, and a file including the document image of the original document C.

The processor 11 may store the generated file in the NVM 14. The processor 11 may store the file in a memory (such as a USB memory) inserted in the image processing apparatus 10. The processor 11 may transmit the file to the external device through the communication interface 15.

Figure 20:
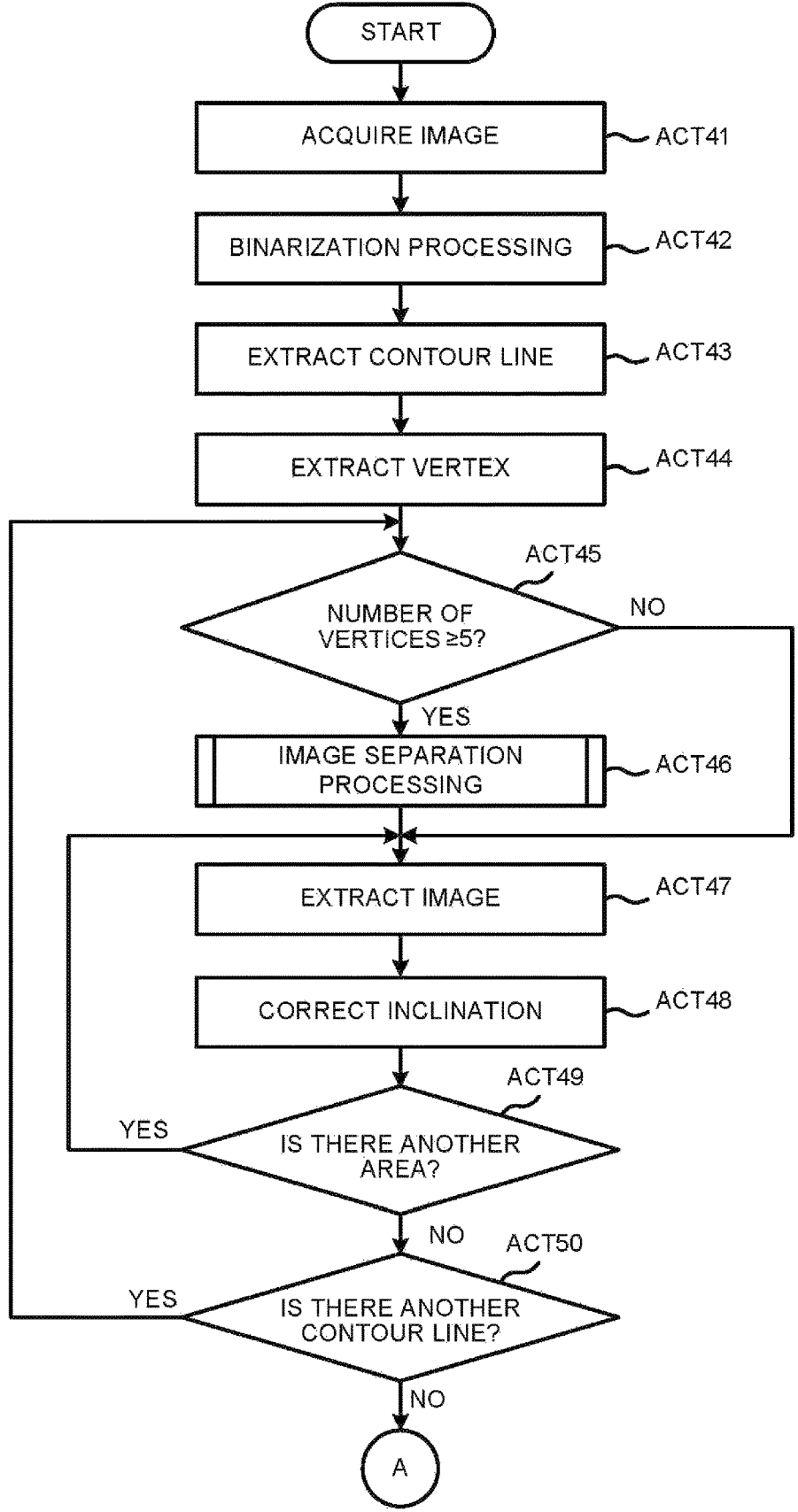
FIG. 20 is a flowchart of the operation of the image processing apparatus according to the second embodiment.
Figure 21:
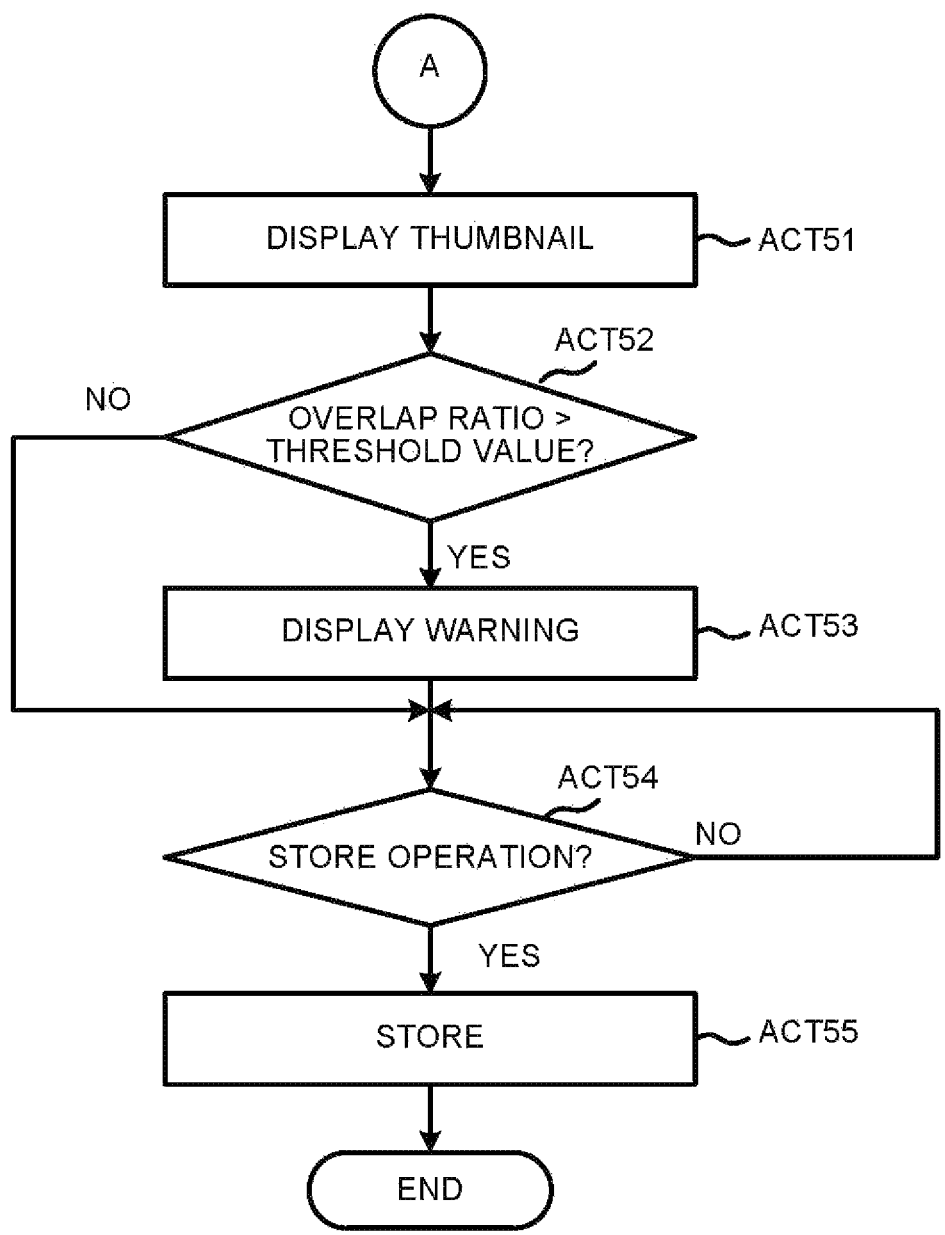
FIG. 21 is a flowchart of the operation of the image processing apparatus according to the second embodiment.

Next, an example of the operation of the image processing apparatus 10 is described. FIG. 20 and FIG. 21 are flowcharts of the operation of the image processing apparatus 10. Here, the user sets the original document in the scanner 17 and inputs an operation to start the scan to the operation panel 19.

First, the processor 11 of the image processing apparatus 10 acquires the scanned image obtained by scanning the original document from the scanner 17 through the scanner interface 16 (ACT 41). Once the scanned image has been acquired, the processor 11 executes the binarization processing on the scanned image (ACT 42).

Once the binarization process has been executed, the processor 11 extracts the contour line of the document area from the scanned image (ACT 43). Once the contour line has been extracted, the processor 11 extracts the vertices from the contour line (ACT 44).

Once the vertices have been extracted, the processor 11 determines whether the number of the vertices in one contour line is five or more (ACT 45). If it is determined that the number of vertices in one contour line is five or more (Yes in ACT 45), the processor 11 executes the image separation processing (ACT 46).

If it is determined that the number of the vertices in one contour line is not five or more (No in ACT 45), or once the image separation process has been executed (ACT 46), the processor 11 extracts one document image from the scanned image (ACT 47).

Once the document image has been extracted, the processor 11 corrects the inclination of the document image (ACT 48). Once the inclination of the document image has been corrected, the processor 11 determines whether there is another single document area (ACT 49).

If it is determined that there is another single document area (Yes in ACT 49), the processor 11 returns to the processing in ACT 47.

If it is determined that there is no other single document area (No in ACT 49), the processor 11 determines whether there is another contour line (ACT 50).

If it is determined that there is another contour line (Yes in ACT 50), the processor 11 returns to the processing in ACT 45. If it is determined that there is no other contour line (No in ACT 50), the processor 11 causes the extracted thumbnail of the document image on the to be displayed on display 21 (ACT 51).

Once the thumbnail has been displayed, the processor 11 determines whether the overlap ratio corresponding to the document image exceeds the predetermined threshold value (ACT 52). If it is determined that the overlap ratio exceeds the predetermined threshold value (Yes in ACT 52), the processor 11 causes the warning to be displayed (ACT 53).

If it is determined that the overlap ratio is less than the predetermined threshold value (No in ACT 52) or once the warning has been displayed (ACT 53), the processor 11 determines whether the operation for storing the document image is received through the operation panel 19 (ACT 54).

If it is determined that the operation for storing the document image is not received (No in ACT 54), the processor 11 repeats the processing in ACT 54.

If it is determined that the operation for storing the document image is received (Yes in ACT 54), the processor 11 stores the document image in a predetermined memory (ACT 55). Once the document image has been stored in the predetermined memory, the processor 11 ends the operation.

Figure 22:
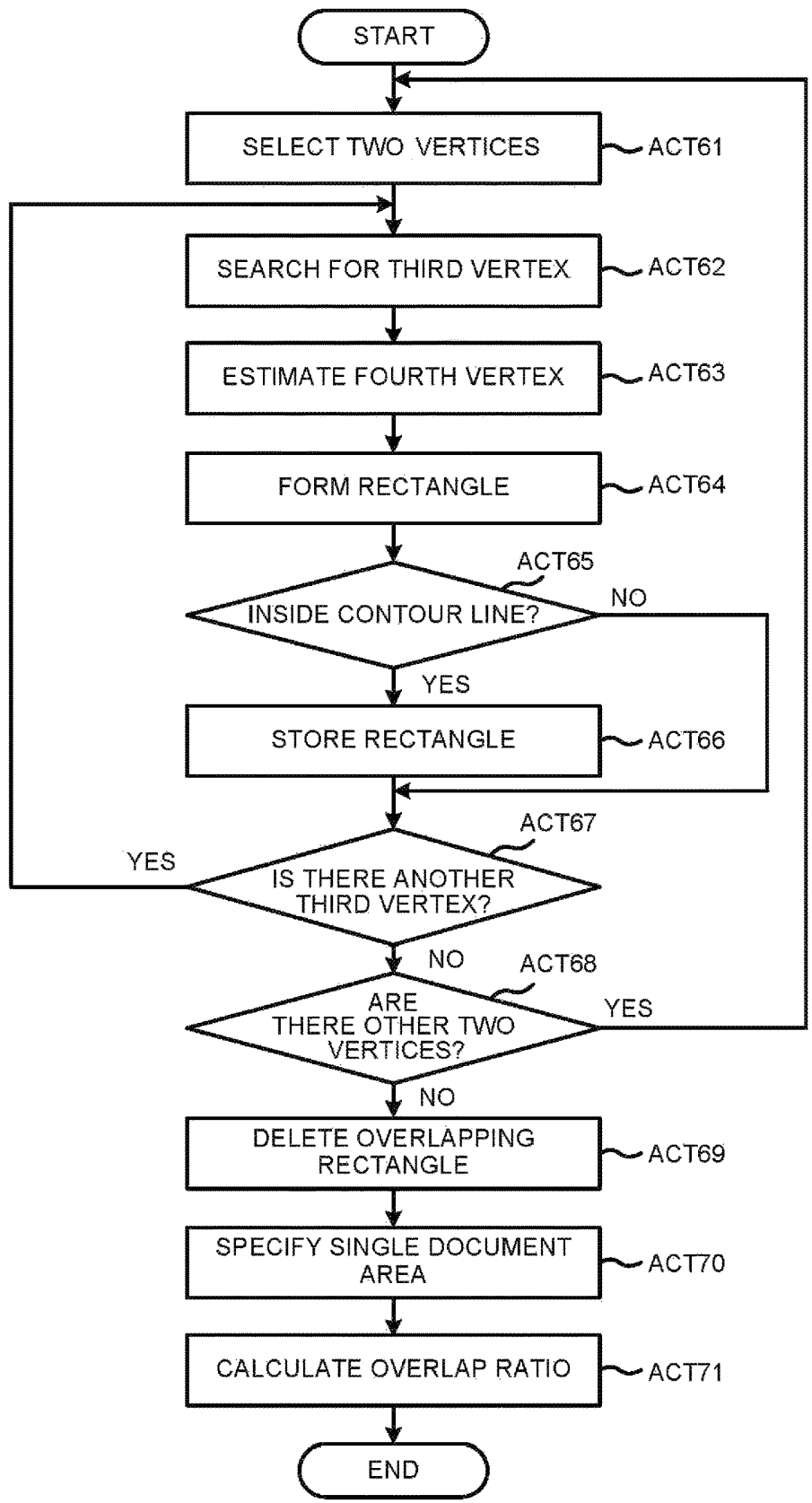
FIG. 22 is a flowchart of the operation of the image processing apparatus according to the second embodiment.

Next, an example of the operation in which the processor 11 executes the image separation processing (ACT 46) is described. FIG. 22 is a flowchart of the operation in which the processor 11 executes the image separation processing.

The processor 11 extracts adjacent first and second vertices from the extracted vertices (ACT 61). Once the first and the second vertices have been extracted, the processor 11 searches for the third vertex forming the right angle with the first and the second vertices (ACT 62).

Once the third vertex has been searched, the processor 11 estimates the fourth vertex forming a rectangle with the first to the third vertices (ACT 63).

Once the fourth vertex has been estimated, the processor 11 forms the rectangle from the first to the fourth vertices (ACT 64). Once the rectangle has been formed, the processor 11 determines whether the formed rectangle is inside the contour line (ACT 65).

If it is determined that the formed rectangle is inside the contour line (Yes in ACT 65), the processor 11 stores the rectangle as the candidate rectangle (ACT 66).

If it is determined that the formed rectangle is not inside the contour line (No in ACT 65), or once the rectangle has been stored as the candidate rectangle (ACT 66), the processor 11 determines whether there is another third vertex that forms the right angle with the first and the second vertices (ACT 67).

If it is determined that there is another third vertex (Yes in ACT 67), the processor 11 returns to the processing in ACT 62.

If it is determined that there is no other third vertex (No in ACT 67), the processor 11 determines whether there are other adjacent first and second vertices (ACT 68). If it is determined that there are other adjacent first and second vertices (Yes in ACT 68), the processor 11 returns to the processing in ACT 61.

If it is determined that there are no other adjacent first and second vertices (No in ACT 68), the processor 11 deletes the candidate rectangle contained in another candidate rectangle (ACT 69). Once the candidate rectangle contained in another candidate rectangle has been deleted, the processor 11 specifies the remaining candidate rectangle as the single document area (ACT 70).

If the remaining candidate rectangle is specified as the single document area, the processor 11 calculates the overlap ratio of each single document area (ACT 71). After the overlap ratio of each single document area is calculated, the processor 11 ends the operation.

The processor 11 may transmit the document image to the external device. The processor 11 may receive the selection of the document image to be stored and store the selected document image.

In other embodiments, the processor 11 may extract the document image of each original document based on the scanned image in which four or more overlapping original documents appear.

The processor 11 may generate one file containing the document images of the respective original documents arranged in the overlapped manner. For example, the processor 11 may generate one file from the document images of the original documents A to C.

The image processing apparatus as described above extracts the third vertex forming the right angle from the adjacent first and second vertices. The image processing apparatus estimates the fourth vertex forming the rectangle with the first to the third vertices. The image processing apparatus extracts the document image from the scanned image based on the rectangle.

As a result, the image processing apparatus can also extract the document image for an original document (where the original document overlaps with a plurality of the original documents) of which the three corners are not consecutive on the contour line. Therefore, the image processing apparatus can specify the document image of each original document even if three or more original documents overlap.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image processing apparatus, comprising:
a processor configured to:
extract a first outermost contour line of a first document area in image data of a plurality of documents, the first document area including a first document and a second document, the first document and the second document partially overlapping each other,
extract a second outermost contour line of a second document area in the image data, the second document area including a third document and a fourth document, the third document and the fourth document partially overlapping each other, the first document area and the second document area not overlapping with each other in the image data,
extract vertices of the first outermost contour line,
extract document image data of the first document and the second document in the first document area based on the extracted vertices of the first outermost contour line, calculate an amount of overlap between the first and second documents in the first document area, generate a warning message if the calculated amount of overlap between the first and second documents is greater than a threshold amount, generate a first single file including the extracted document image data for the first document and the second document, extract vertices of the second outermost contour line, extract document image data of the third document and the fourth document in the second document area based on the extracted vertices of the second outermost contour line, and generate a second single file including the extracted document image data for the third document and the fourth document; and a memory configured to store the first single file and the second single file.

2. The image processing apparatus according to claim 1, wherein the image data is loaded from the memory.

3. The image processing apparatus according to claim 1, wherein the processor is further configured to correct an inclination of the extracted document image data.

4. The image processing apparatus according to claim 1, wherein the processor is configured to:

extract first to third vertices of the first outermost contour line that are adjacent to one another and form a right angle or an approximate right angle, estimate a fourth vertex from the first to third vertices such that the first to fourth vertices form a rectangle or an approximate rectangle, and extract document image data from the image data based on the rectangle or the approximate rectangle.

5. The image processing apparatus according to claim 4, wherein the processor is configured to determine whether the rectangle is formed within the document area and extract the document image data from the image data only if the rectangle is inside the document area.

6. The image processing apparatus according to claim 1, wherein the processor is configured to:

acquire the image data from the memory; and perform a binarization process on the image data before extracting the first outermost contour line.

7. A method of processing image data including a plurality of documents, the method comprising:

extracting a first outermost contour line of a first document area in image data of a plurality of documents, the first document area including a first document and a second document, the first document and the second document partially overlapping each other;

extracting a second outermost contour line of a second document area in the image data, the second document area including a third document and a fourth document, the third document and the fourth document partially overlapping each other, the first document area and the second document area not overlapping with each other in the image data;

extracting vertices of the first outermost contour line;

extracting document image data of the first document and the second document in the first document area based on the extracted vertices of the first outermost contour line;

calculating an amount of overlap for the first document and the second document in the first document area, generating a warning message if the calculated amount of overlap for the first and second documents is greater than a threshold amount, generating a first single file including the extracted document image data for the first document and the second document;

extracting vertices of the second outermost contour line;

extracting document image data of the third document and the fourth document in the second document area based on the extracted vertices of the second outermost contour line;

generating a second single file including the extracted document image data for the third document and the fourth document; and storing the first single file and the second single file in a memory.

8. The method according to claim 7, further comprising: loading the image data from the memory.

9. The method according to claim 7, further comprising: correcting an inclination of the extracted document image data.

10. The method according to claim 7, further comprising:

extracting first to third vertices of the first outermost contour line that are adjacent to one another and form a right angle or an approximate right angle;

estimating a fourth vertex from the first to third vertices such that the first to fourth vertices form a rectangle or an approximate rectangle; and extracting document image data from the image data based on the rectangle or the approximate rectangle.

11. The method according to claim 10, further comprising:

determining whether the rectangle is formed within the document area and extracting the document image data from the image data only if the rectangle is inside the document area.

12. The method according to claim 7, further comprising:

acquiring the image data from the memory; and performing a binarization process on the image data before extracting the first outermost contour line.

13. A non-transitory computer readable medium comprising instructions that are executable in an image processing apparatus, wherein the instructions when executed in the image processing apparatus cause the image processing apparatus to carry out a method of processing image data, said method comprising:

extracting a first outermost contour line of a first document area in image data of a plurality of documents, the first document area including a first document and a second document, the first document and the second document partially overlapping each other;

extracting a second outermost contour line of a second document area in the image data, the second document area including a third document and a fourth document, the third document and the fourth document partially overlapping each other, the first document area and the second document area not overlapping with each other in the image data;

extracting vertices of the first outermost contour line;

extracting document image data of the first document and the second document in the first document area based on the extracted vertices of the first outermost contour line;

calculating an amount of overlap for the first document and the second document in the first document area, generating a warning message if the calculated amount of overlap for the first and second documents is greater than a threshold amount, generating a first single file including the extracted document image data for the first document and the second document;

extracting vertices of the second outermost contour line;

extracting document image data of a third document and a fourth document in the second document area based on the extracted vertices of the second outermost contour line;

generating a second single file including the extracted document image data for the third document and the fourth document; and storing the first single file and the second single file in a memory.

14. The non-transitory computer readable medium according to claim 13, wherein the method further comprises:

acquiring the image data from the memory; and performing a binarization process on the image data before extracting the first outermost contour line.

15. The non-transitory computer readable medium according to claim 13, wherein the method further comprises:

calculating an amount of overlap for the third document and the fourth document in the second document area; and generating a warning message if the amount of overlap for the third and fourth documents is greater than the threshold amount.

16. The image processing apparatus according to claim 1, wherein the processor is further configured to:

calculate an amount of overlap between the third and fourth documents in the second document area, and generate a warning message if the calculated amount of overlap between the third and fourth documents is greater than the threshold amount.

17. The method according to claim 7, further comprising:

calculating an amount of overlap for the third document and the fourth document in the second document area; and generating a warning message if the amount of overlap for the third and fourth documents is greater than the threshold amount.

* * * * *